(12) United States Patent
Wabnig et al.

(10) Patent No.: US 9,794,065 B2
(45) Date of Patent: Oct. 17, 2017

(54) QUANTUM KEY DISTRIBUTION

(71) Applicant: Nokia Technologies Oy, Espoo (FI)

(72) Inventors: Joachim Wabnig, Cambridge (GB);
Antti Niskanen, Cambridge (GB);
Hongwei Li, Cambridge (GB); David Bitauld, Cambridge (GB)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 14/435,695

(22) PCT Filed: Oct. 15, 2012

(86) PCT No.: PCT/IB2012/055591
§ 371 (c)(1),
(2) Date: Apr. 14, 2015

(87) PCT Pub. No.: WO2014/060793
PCT Pub. Date: Apr. 24, 2014

(65) Prior Publication Data
US 2015/0249537 A1    Sep. 3, 2015

(51) Int. Cl.
*H04K 1/00* (2006.01)
*H04L 9/08* (2006.01)
*H04B 10/70* (2013.01)

(52) U.S. Cl.
CPC .......... *H04L 9/0858* (2013.01); *H04B 10/70* (2013.01); *H04L 2209/24* (2013.01); *H04L 2209/34* (2013.01)

(58) Field of Classification Search
CPC ...................................................... H04B 10/70
(Continued)

(56) References Cited

U.S. PATENT DOCUMENTS 5,109,462 A * 4/1992 Watanabe .............. G02F 1/377
359/328
8,054,976 B2 11/2011 Harrison et al.
(Continued)

FOREIGN PATENT DOCUMENTS

CN    101208890 A    6/2008
JP    2009126606     6/2009
(Continued)

OTHER PUBLICATIONS

Bengt-Erik Olsson, Peter Öhlén, Lavanya Rau, and Daniel J. Blumenthal, "A Simple and Robust 40-Gb/s Wavelength Converter Using Fiber Cross-Phase Modulation and Optical Filtering", IEEE Photonics Technology Letters, vol. 12, No. 7, Jul. 2000.*
(Continued)

*Primary Examiner* — Taghi Arani
*Assistant Examiner* — Khalil Naghdali
(74) *Attorney, Agent, or Firm* — Harrington & Smith

(57) ABSTRACT

Methods and apparatus for distribution of keys are disclosed. An optical signal for carrying encoded information in accordance with a quantum key distribution scheme is generated. The generated optical signal has a wavelength which is changed to another wavelength prior to transmission of the optical signal. The optical signal carrying the encoded information and having the changed wavelength is received, where after decoding of the information takes place by means of detector apparatus operating in the changed wavelength.

15 Claims, 3 Drawing Sheets

(58) Field of Classification Search
USPC .......................................................... 380/256
See application file for complete search history.

(56) References Cited

U.S. PATENT DOCUMENTS

| | | | |
|---|---|---|---|
| 2007/0228373 A1 | 10/2007 | Takemoto et al. | |
| 2009/0034737 A1 | 2/2009 | Trifonov | |
| 2011/0019823 A1* | 1/2011 | Townsend | H04L 9/0852 380/256 |
| 2012/0016635 A1* | 1/2012 | Brodsky | G01J 1/08 702/181 |
| 2012/0087500 A1* | 4/2012 | Ukita | H04B 10/70 380/256 |
| 2013/0082286 A1* | 4/2013 | Finkelstein | H01L 31/0336 257/84 |
| 2013/0187051 A1* | 7/2013 | McCaughan | H01L 39/02 250/340 |

FOREIGN PATENT DOCUMENTS

| | | |
|---|---|---|
| JP | 2009216775 | 9/2009 |
| WO | 2009/017579 A1 | 2/2009 |
| WO | 2013/179094 A1 | 12/2013 |

OTHER PUBLICATIONS

Zhao et al. "Experimental quantum key distribution with decoy states" Physical Review Letters; published Feb. 24, 2006 by Physical Review Letters (PRL 96, 070502 (2006), pp. 070502-1 to 070502-4.*

International Search Report and Written Opinion received for corresponding Patent Cooperation Treaty Application No. PCT/IB2012/055591 , dated Sep. 2, 2013, 12 pages.

Pelc, J.S. et al. "High Speed single-photon detection at 1550 nm via cascaded frequency upconversion" In Lasers and Electro-Optics (CLEO), 2012 Conference on 2012, p. 1-2.

Kun, J. et al. "Synchronized Fiber Lasers for Efficient Coincidence Single-Photon Frequency Upconversion." Selected Topics in Quantum Electronics, IEEE Journal of 2012, vol. 18, No. 2, pp. 562-566.

Eisaman, M.D. et al. "Invited Review Article: Single-photon sources and detector", Review of Scientific Instruments, Jul. 2011, vol. 82, No. 7, pp. 071101-071125.

Extended European Search Report received for corresponding European Patent Application No. 12886563.1, dated Apr. 26, 2016, 7 pages.

* cited by examiner

QUANTUM KEY DISTRIBUTION

RELATED APPLICATION

This application was originally filed as PCT Application No. PCT/IB2012/055591 filed Oct. 15, 2012.

This disclosure relates to communications and more particularly to distribution of quantum keys for use in communications.

A communication link can provided between two or more devices such as fixed and/or mobile communication devices, access point devices such as base stations, servers, machine type devices, and so on. The communications may occur over fixed or wireless connections.

Transmissions between communicating devices may need to be secured. Examples of applications that typically rely on secure transactions over the Internet or other networks include banking, shopping, email, corporate communications, cloud computing and so on. Such communications can be open to attacks and security problems have become increasingly topical. The vvolume of sensitive information transmitted between various devices is increasing. Also, new applications requiring safe communications are emerging. Security of telecommunication channels is thus becoming of increasing importance.

Devices such as personal computers, servers and other devices associated with a communications link have traditionally been mostly fixed and connected through cables and/or fibre optics. However, the number of mobile devices that communicate over wireless interfaces is increasing. This can increase threats on security.

Current approaches to protect data are based on cryptographic schemes that rely on computational difficulty to solve certain classes of mathematical problems. However, as computers become more powerful in solving problems, the complexity of the encryption needs to be increased accordingly. Encryption with the help of quantum key distribution (QKD) is considered a mathematically secure way for providing security where the trust can be placed on the laws of physics rather than increased complexity and computing power. The QKD is based on use of photon detectors. The efficiency of these depends on the wavelength of the received optical signal.

It is noted that the issues discussed here are not limited to any particular communication environments and apparatus but may occur in any context where security is provided for communications based on QKD.

Embodiments of the invention aim to address one or several of the above issues.

In accordance with an embodiment there is provided a method, comprising generating an optical signal for carrying encoded information in accordance with a quantum key distribution scheme, the optical signal having a wavelength, and changing the wavelength of the optical signal prior to transmission of the optical signal.

In accordance with an embodiment there is provided a method, comprising receiving an optical signal carrying encoded information in accordance with a quantum key distribution scheme, wherein the wavelength of the optical signal has been changed prior to transmission of the optical signal, and decoding the information by means of detector apparatus operating in the changed wavelength.

In accordance with an embodiment there is provided an apparatus, configured to generate an optical signal for carrying encoded information in accordance with a quantum key distribution scheme, the optical signal having a wavelength, and change the wavelength of the optical signal prior to transmission of the optical signal.

In accordance with an embodiment there is provided an apparatus, configured to receive optical signal carrying encoded information in accordance with a quantum key distribution scheme, wherein the wavelength of the optical signal has been changed prior to transmission of the optical signal, and decode the information by means of detector apparatus operative at the changed wavelength.

In accordance with more detailed embodiments the wavelength can be shortened or lengthened. The change may be provided by second or third harmonic generation or pump-beam assisted up-conversion. The optical signal may also be fed through a non-linear crystal or a stack of cross-polarized crystals. The changed signal may also be filtered and/or attenuated prior to transmission.

The quantum key distribution scheme may comprise a faint pulse based quantum key distribution. The optical pulses in the optical signal may comprise on average less than one photon.

An integrated indium phosphide based chip or a silicon based chip comprising light sources, a 2-3 converter and a polarization rotator combiner may be provided.

The detector apparatus may comprise at least one single photon detector configured to operate efficiently in wavelengths less than one micron.

A device such as a mobile communication device and/or a station base station node arranged to implement the embodiments may also be provided.

A computer program comprising program code means adapted to perform the herein described methods may also be provided. In accordance with further embodiments apparatus and/or computer program product that can be embodied on a computer readable medium for providing at least one of the above methods is provided.

It should be appreciated that any feature of any aspect may be combined with any other feature of any other aspect.

Embodiments will now be described in further detail, by way of example only, with reference to the following examples and accompanying drawings, in which.

In the following certain exemplifying embodiments are explained in the context of wireless or mobile communications where secure communications are provided for a mobile communication device. A mobile device of a user for communications with e.g. a base station is often referred to as user equipment (UE) or terminal. A mobile device for implementing the embodiments may be provided by any device capable of sending signals to and/or receiving wireless signals on a channel. The mobile device is also provided with apparatus for communication on an optical channel. Non-limiting examples of mobile devices include a mobile station (MS) such as a mobile phone or what is known as a 'smart phone', a portable computer such as a laptop, tablet or a personal data assistant (PDA) provided with wireless communication capabilities, or any combinations of these or the like. An appropriate mobile device is provided with at least one data processing entity, at least one memory, and other possible components for use in software and hardware aided execution of tasks it is designed to perform, including control of communications with other parties and features relating to secure communications. The data processing, storage and other relevant control apparatus can be provided on an appropriate circuit board and/or in chipsets.

A quantum key distribution system can be used in securing communications. Quantum key distribution (QKD) can be used with optical transmission channels, for example free space (suitable for mobile telecommunications), waveguides and optical fibres. A possible use case can be a mobile device establishing a shared key with a stationary terminal. Implementations of quantum key distribution schemes rely on sending a low number of photons, on average less than a single photon per pulse between two terminals. Quantum cryptography as such is known and several companies offer fibre-based quantum key distribution devices. Cryptographic schemes that use properties of quantum mechanical systems to distribute a secure key are considered as providing high levels of security. For example, the current belief is that even a powerful eavesdropper who would only be limited by the laws of physics should not be able to compromise the security of the scheme.

Figure 1:
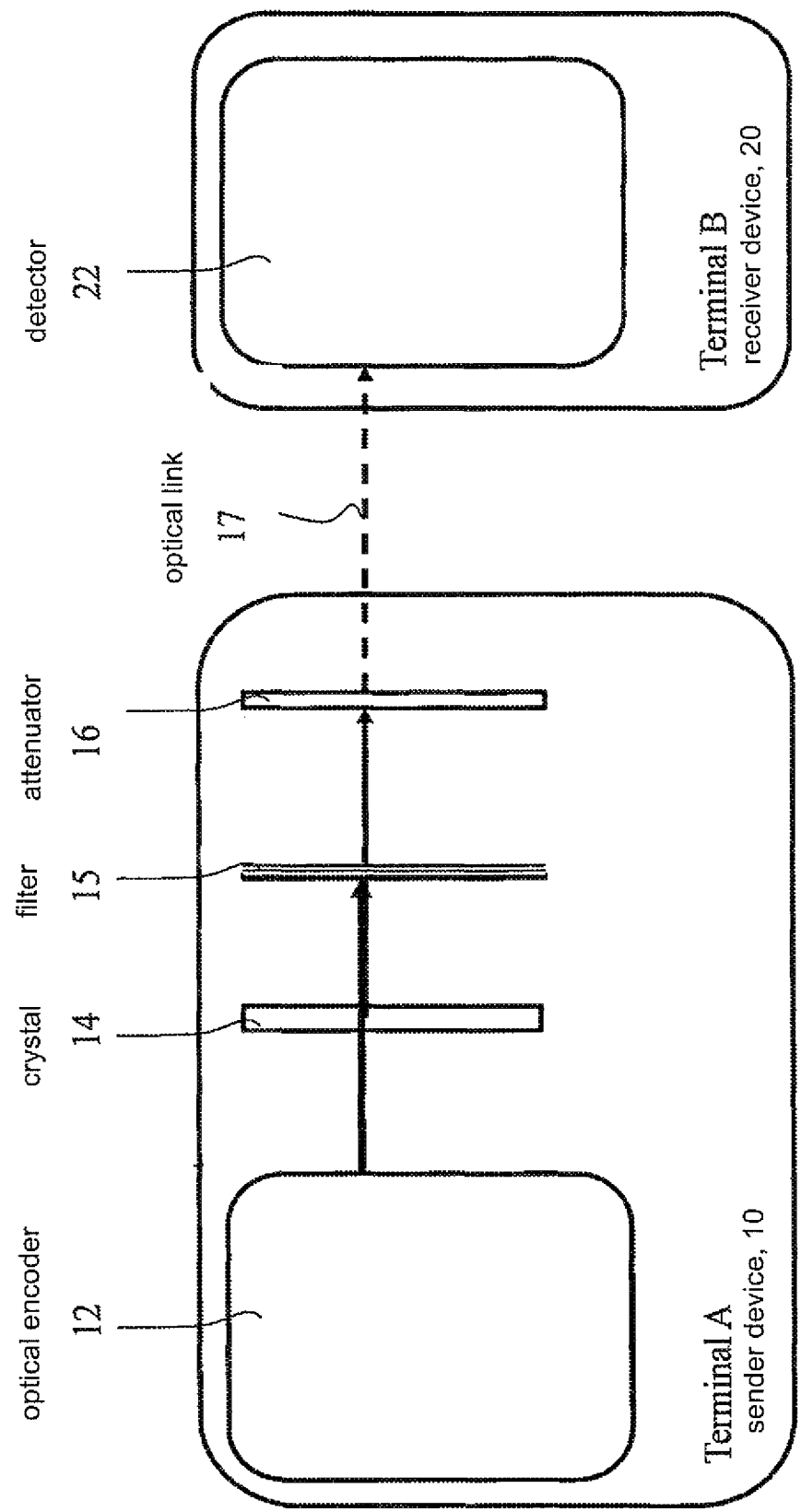
FIG. 1 shows a schematic diagram of two devices in accordance with an embodiment.

A quantum key distribution scheme can be provided between key sender and recipient devices. FIG. 1 shows a sender device 10, labelled terminal A, and a recipient device 20, labelled terminal B. Terminal A is a qubit sender and terminal B is a receiver. In accordance with an embodiment terminal A comprises a mobile device, for example a mobile phone or a smartphone, a laptop, a notebook, a tablet computer and so forth and terminal B comprises a fixed node, for example a base station of a cellular system or a local network system. A radio frequency (RF) wireless link can provided between devices 10 and 20. Both devices can be provided with a communications subsystem for the wireless communications, for example with appropriate radio apparatus to facilitate wireless communications. It is noted that a communication channel between devices 10 and 20 can also be provided based on other technologies, such as via an optical link.

Distribution of keys between devices 10 and 20 for secure communications is based on sending of photons from device 10 to device 20 over an optical link 17, shown by a dashed line. The key distribution is based on sending photons, and in practice, faint pulses containing a photon number smaller than one in average from terminal A to terminal B. The principles described herein can be applied to most of the QKD protocols based on faint pulses in fibre or free space Apparatus at device 10 for generating and emitting the photons can comprise an optical encoder 12 adapted for encoding of random qubit states and emitting photons. Elements such as control electronics for creating electrical pulses needed to emit photons, a (quantum) random number generator, and a processor apparatus for controlling these components may also be provided. The apparatus 12 for optical encoding can be adapted to probabilistically convert light pulses emitted by the light sources into photons.

At the receiving node 20 appropriate decoding and detector apparatus 22 is provided. Control electronics adapted for processing detector outputs and record their time trace, a communications subsystem for the wireless communication, and a computer or processor for controlling the above components can also be provided.

Optical components required to produce and transmit optical signals (lasers, modulators, integrated optics on semiconductors) are widely available, well performing and reasonably priced for example at wavelengths in domains around 1.3 and 1.55 μm (microns). However, on the receiving side, while detectors exist that are good enough for classical communication at those wavelengths, single photon detectors required for quantum cryptography can be inefficient, noisy, bulky and/or expensive. On the other hand, the inventors have recognised that efficient low-noise detectors are available for wavelengths below 1 micron. Integrated photonics can also be found at those wavelengths on dielectric platforms. Wavelength conversion can be provided to improve efficiency and/or address other issues.

FIG. 1 discloses a possible wavelength conversion before transmission of the encoded information on the optical interface 17 in accordance with a quantum key distribution scheme. The embodiment aims to provide the advantages existing in two different wavelength ranges without unnecessarily compromising overall performance. This is based on recognition that there is a stage in QKD systems where losses can be tolerated. Conversion in the emitting device prior to transmission provides a freedom to adjust the wavelength to preferred technologies, either by up or down conversion. This can be used to address a mismatch between the wavelength at which encoding is efficient and the wavelength at which detection is efficient.

In FIG. 1 the optical wavelength of the signal output from encoder 12 is converted just before transmission on link 17. This can be done because at this stage conversion efficiency does not matter. Conversion prior to transmission allows efficient encoding of the optical signal in a wavelength domain where components are widely available while also enabling use of detectors that are more efficient. Typically this would mean wavelengths below 1 micron level. Even though wavelength conversion may be inefficient for low power light, the inventors have recognised that this is not a problem e.g. in the case of faint pulse-based quantum key distribution, this being currently the most common type of QKD. Before explaining exemplifying components for changing the wavelength in more detail, a general description of possible operation of devices 10 and 20 is given with reference to FIGS. 2 and 3.

Figure 2:
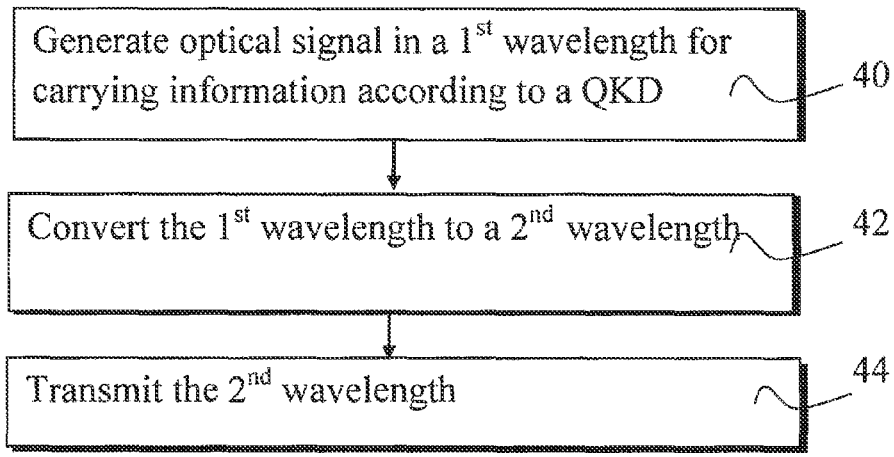
FIGS. 2 and 3 show flowcharts in accordance with two embodiments.

FIG. 2 illustrates the general principle of operation for communications of photons by a sender device. An optical signal is generated at 40 for carrying encoded information in accordance with a quantum key distribution scheme. At this stage the optical signal has a first wavelength. At 42 the first wavelength is changed to have a second wavelength of the optical signal prior to transmission of the optical signal. The changed wavelength can then be transmitted at 44 to the receiver device on an optical link between the devices.

Figure 3:
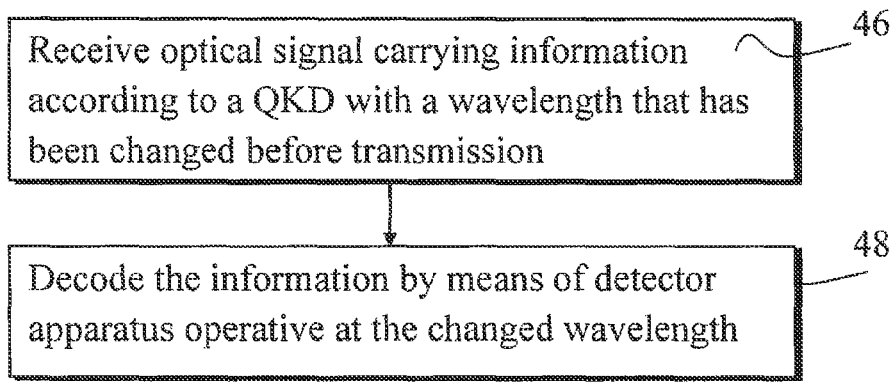

FIG. 3 shows the operation at the recipient device. The recipient device receives at 46 from the sender device photons via the optical channel. The optical signal carries the encoded information in accordance with the quantum key distribution scheme and has the changed wavelength. The information is then decoded at 48 by means of a detector apparatus considered suitable for use with the changed wavelength.

A more detailed procedure for distributing a key between the sender and recipient devices in accordance with an embodiment where the wavelength is converted to a shorter wavelength is now described referring again to FIG. 1.

Wavelength conversion can be performed in various manners. For example, the conversion can be based on second or third harmonic generation (i.e. frequency doubling or tripling). Another example is up-conversion with the help of a pump beam. This can be provided e.g. based on sum/difference frequency generation or four-wave mixing.

In terminal A, optically encoded pulses can be generated at a wavelength before conversion, e.g. 1.55 microns. Those pulses are then converted to a shorter wavelength by a nonlinear crystal 14 or a stack of cross-polarized crystals.

The pulses can go through a non-linear crystal that is adapted to convert their wavelength to a shorter value, e.g. to a half in the case of frequency doubling. Non-linear crystals are typically polarization-dependent and polarization-based protocols can use a stack of two cross-polarized crystals to overcome this. The remaining long-wavelength light is filtered out and the generated short wavelength light is transmitted to terminal B. The remaining long-wavelength, if any, can be filtered out for example by a spectral filter 15.

In terminal A qubit states can be randomly chosen and sequentially encoded in an optical pulse by the encoder 12. The physical encoding can take several forms such as polarization encoding, time bin-phase encoding, time-energy encoding, and so on. This can be done on e.g. a semiconductor integrated photonics platform including lasers and couplers. The optical pulses produced by such technologies typically have a wavelength>1.1 microns and a power in the mW range.

In accordance with another embodiment a wavelength output by the encoder is converted to a longer wavelength prior to emission thereof. For example, down-conversion can be applied to the signal after encoding and prior to transmission to achieve a wavelength that is more appropriate for the transmission to and/or detection by decoder apparatus, depending on the application.

Whether the conversion before transmission is up or down depends on the technologies used for encoding, transmitting, decoding and detecting.

Decoding and detection are performed in terminal B in block 22. The decoding can be made with dielectric integrated photonics circuits or any component suitable for the transmitted wavelength. Shortened wavelengths can be less than 1.1 microns. Efficient single photon detectors are used to sense the presence of photons in each time bin defined by the expected arrival time of the faint pulse. After this, QKD protocols can require terminals A and B to publicly exchange information and process their respective data in order to obtain a secure key.

In certain protocols light may need to be attenuated. Power is cut down by many orders of magnitude before transmission in order to reach single-photon-level power. The amount of photons produced by inefficient wavelength conversion is still enough. The short wavelength pulses output from the filter 15 can be attenuated by attenuator 16 just before transmission on link 17 in order to contain less than one photon per pulse in average.

Exemplifying implementations of the optical encoder and decoder apparatus for devices 10 and 20 are now discussed with reference to FIGS. 4 and 5. It is noted that these Figures represent only certain possible implementations of the emitter and the receiver, respectively. In this embodiment polarization encoded faint pulses can be used as a means to transmit qubits. Pulses can be emitted in three different polarizations from terminal A and measurement are performed in terminal B on three unbiased polarization bases (i.e. 6 different polarizations).

Figure 4:
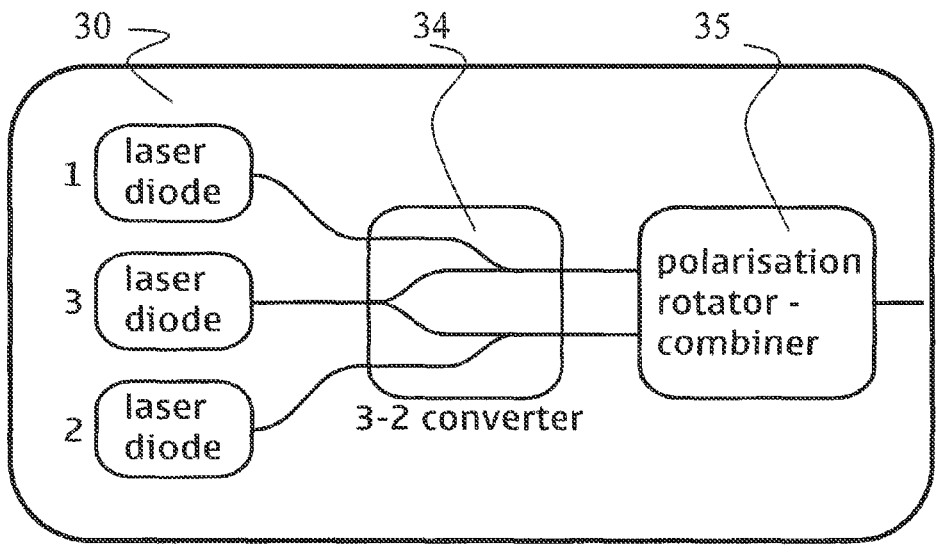
FIGS. 4 and 5 show block diagrams of exemplifying optical encoder and decoder, respectively.

In accordance with the example shown in FIG. 4 an optical encoder 30 comprises three light sources 1, 2, 3. In FIG. 4 optical encoding is shown in the case of a three polarization state emission. One light source is randomly switched "On" at once. A 3-2 integrated optics converter generates three different dual-rail encodings out of the three possible lasers. Each dual-rail encoding can be converted into a polarization encoding with a polarization rotator/combiner.

The light sources 1-3 can be provided by any appropriate source, for example by laser diodes or light emitting diodes (LEDs). A 3-2 converter is denoted by reference 34 and a polarisation rotator-combiner is denoted by 35. Light generated by the light sources 1-3 can be converted to dual-rail encoding by the 3-2 converter such that light source 1 creates a pulse on a first rail and light source 2 creates a pulse on a second rail whilst light source 3 creates a pulse on both rails. The intensity of the pulse generated by light source 3 can be equal on both rails. In accordance with a possibility the 3-2 converter apparatus can be implemented as integrated waveguides on a chip. The 3-2 converter can comprise a 50-50 beam splitter and two y-junctions connected as depicted in FIG. 4. The polarisation rotator-combiner 35 converts the dual rail encoding into the polarisation encoding (1, 2, 3). After that a spectral and spatial filter may be applied to ensure that the three pulses are indistinguishable due to their spatial and frequency characteristics.

Attenuation may be applied before the photons exit the apparatus to bring the light pulses down to single photon level. Thus an attenuator may be provided as the last element of the optical encoder. The attenuation can be used to introduce a probabilistic element as the attenuation can be chosen in such a way that the average photon number per pulse is smaller than one.

Figure 5:
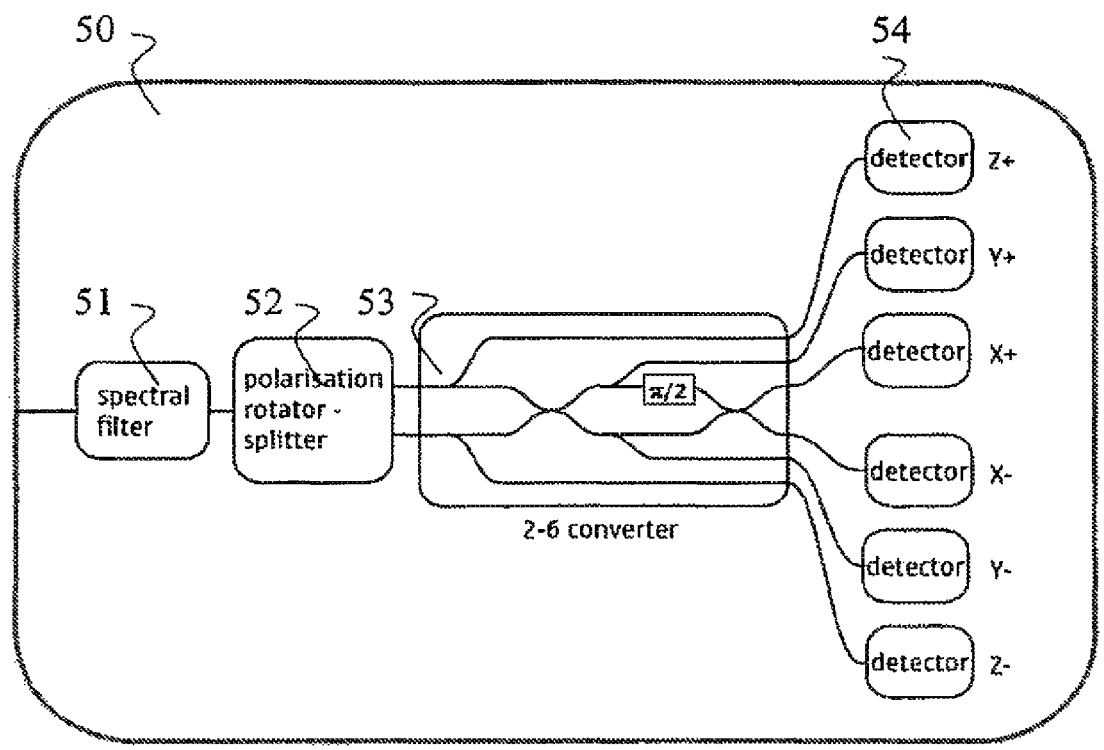

In FIG. 5 example a decoder 50 is provided where decoding and detection can take place in six different polarizations. For example, the optical decoder can be adapted for detecting single photons and their polarisation along the three axes of the Poincarre sphere i.e. capable of providing six possible outputs may be provided. The decoder comprises a spectral filter 51 to filter out ambient light and allow only light sent from terminal A to remove undesirable optical background. The polarization rotator-splitter transforms polarization encoding into dual-rail encoding. The integrated 2-6 converter allows us to measure dual-rail encoding in three unbiased bases (2 polarizations per basis). A polarisation rotator-splitter 52 is provided to convert the photon polarisation to dual rail encoding. A 2-6 converter 53 is used to convert dual rail encoding to six separate channels. Six single photon detectors 54 (e.g. single-photon avalanche diodes) are also shown. The 2-6 converter 53 can be implemented as integrated waveguides on a chip, a possible layout of the chip being shown in FIG. 5, The 2-6 converter can consist of 2 beam splitters, two phase shifters and four y-junctions. The transmission of the y-junctions can be adjusted to influence the relative frequency of detection events.

On the emitter side, the lasers, the 2-3 converter and the polarization rotator-combiner of FIG. 4 can all be integrated on a single indium phosphide based chip or silicon based chip working with 1.55 micron wavelengths. Indium phosphide is transparent above 0.9 μm and silicon is transparent above 1.1 μm. In certain applications optical wavelengths up to 2 μm may be output from the encoder, this being in line with shortened wavelengths of up to 1 μm if e.g. frequency doubling is used for the conversion. It is noted that all values given herein are non-limiting exemplifying values for wavelengths before conversion in device 10 are given to illustrate possible efficient wavelengths in certain exemplifying technologies.

On the receiver side the polarization splitter-rotator and the 2-6 converter of FIG. 5 can be integrated for example on a silicon nitride-silicon oxide based chip. The detectors can be silicon avalanche photodiodes. This may be advantageous because if the wavelength is shortened to 775 nm such diodes are considered very efficient. On more general level, for various applications it is believed that efficient detection can be obtained by wavelengths below 1 um.

In accordance with a possibility the wavelength conversion can be performed directly on-chip, even on silicon. It is noted that a single photon based scheme can be provided also in various other ways. For example, true single photon emitters may be used. Another example is heralded single photon sources.

The herein described embodiments may be beneficial e.g. because the QKD can be provided with a wider variety of readily available efficient components. By adjusting the wavelength at a stage where losses can be tolerated to desired technologies efficient, cheap and/or compact quantum cryptography based systems may be provided.

It is noted that whilst embodiments have been described using a mobile communication system as an example, similar principles can be applied to any other system where security can be provided based on a quantum key distribution mechanism between communicating devices. For example, instead of communications between a mobile station and a base station the communications may be provided between two mobile devices, or between two static or semi-static devices. For example, the principles can be applied where no fixed equipment is provided but a communication system is provided by means of a plurality of user equipment, for example in adhoc networks. The communications may also occur between fixedly located devices and over a medium enabling communications of optical signals, for example between devices communication via fibre optics. Therefore, although certain embodiments were described above by way of example with reference to certain exemplifying architectures for wireless networks, technologies and standards, embodiments may be applied to any other suitable forms of communication systems than those illustrated and described herein.

Figure 6:
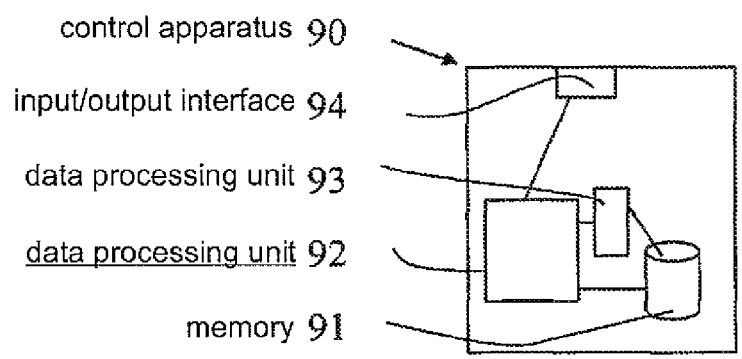
FIG. 6 shows an example of control apparatus.

Mobile devices, base stations and other communicating devices are typically controlled by at least one appropriate controller apparatus so as to enable operation thereof and control of wireless communications between the devices and/or the base station. The control apparatus can be interconnected with other control entities. FIG. 6 shows an example of a control apparatus 90 capable of operating in accordance with the embodiments, for example to be coupled to and/or for controlling devices 10 and 20. The control apparatus can be configured to provide control functions in association with determination of various information, generation and communication of information between the various entities and/or control functions based on such information by means of the data processing facility in accordance with the certain embodiments described above. For this purpose the control apparatus comprises at least one memory 91, at least one data processing unit 92, 93 and an input/output interface 94. The control apparatus can be coupled to a receiver and/or transmitter of the relevant node via the interface. The control apparatus can be configured to execute an appropriate software code to provide the control functions. The control apparatus and functions may be distributed between a plurality of control units.

The required data processing apparatus and functions may be provided by means of one or more data processors. The described functions may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the spirit and scope of this invention as defined in the appended claims. Indeed there is a further embodiment comprising a combination of one or more of any of the other embodiments previously discussed.

The invention claimed is:

1. A method for distributing a quantum encryption key, the method comprising:
    encoding a sequence of random qubit states onto an optical signal having a first wavelength,
    changing the first wavelength of the optical signal to a shorter second wavelength, and thereafter
    transmitting the optical signal having the shorter second wavelength with the encoded sequence of random qubit states in accordance with a faint pulse quantum key distribution scheme comprising on average less than one photon per pulse.

2. A method according to claim 1, wherein changing the first wavelength to the shorter second wavelength comprises shortening the first wavelength by second or third harmonic generation.

3. A method according to claim 1, wherein the first wavelength is changed to the shorter second wavelength by feeding the optical signal with the encoded information through a non-linear crystal or a stack of cross-polarized crystals.

4. A method according to claim 3, comprising, after feeding the optical signal and prior to the transmitting, filtering out remaining light having a wavelength that is longer than the second wavelength.

5. A method for decoding a quantum encryption key, the method comprising:
   receiving an optical signal carrying an encoded sequence of random qubit states in accordance with a faint pulse quantum key distribution scheme comprising on average less than one photon per pulse, wherein the optical signal is received having a second wavelength and the sequence of random qubit states is encoded thereon at a longer first wavelength, and
   decoding the sequence of random qubit states using an optical detector operating in the second wavelength.

6. An apparatus, comprising:
   an optical encoder configured to encode a sequence of random qubit states onto an optical signal having a first wavelength;
   at least one crystal configured to change the first wavelength of the optical signal received from the optical encoder to a shorter second wavelength prior to transmission of the optical signal from the apparatus; and
   an attenuator configured to reduce power of the optical signal received from the at least one crystal for transmission of the optical signal in accordance with a faint pulse quantum key distribution scheme comprising on average less than one photon per pulse.

7. An apparatus according to claim 6, wherein the first wavelength is in the range of 0.9 to 2 microns.

8. An apparatus according to claim 6, wherein the at least one crystal comprises at least one of a non-linear crystal and a stack of cross-polarized crystals.

9. An apparatus according to claim 6, further comprising a filter disposed between the at least one crystal and the attenuator.

10. An apparatus according to claim 6, wherein the optical encoder is disposed on an integrated indium phosphide based chip or a silicon based chip, the optical encoder comprising light sources, a 2-3 converter and a polarization rotator combiner.

11. An apparatus, comprising:
   an optical interface configured to receive an optical signal carrying an encoded sequence of random qubit states in accordance with a faint pulse quantum key distribution scheme comprising on average less than one photon per pulse, wherein the optical signal is received having a second wavelength and the information is encoded thereon at a longer first wavelength, and
   an optical decoder configured to decode the sequence of random qubit states in the second wavelength.

12. An apparatus according to claim 11, wherein the optical detector comprises at least one single photon detector and the second wavelength is less than one micron.

13. An apparatus according to claim 11, comprising at least one integrated photonic circuit.

14. An apparatus according to claim 11, wherein the detector comprises at least one single-photon avalanche diode.

15. An apparatus according to claim 11, comprising an integrated polarization splitter-rotator disposed between the optical interface and a 2-6 converter on a silicon nitride-silicon oxide based chip.

\* \* \* \* \*